United States Patent
Douglas et al.

(10) Patent No.: US 11,301,225 B2
(45) Date of Patent: *Apr. 12, 2022

(54) REDUCING APPLICATION STARTUP TIME BY GENERATING BYTECODE FROM METADATA AT BUILD TIME

(71) Applicant: Red Hat, Inc., Raleigh, NC (US)

(72) Inventors: Stuart Douglas, Orange (AU); Jason Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,996

(22) Filed: Sep. 21, 2020

(65) Prior Publication Data

US 2021/0004215 A1 Jan. 7, 2021

Related U.S. Application Data

(63) Continuation of application No. 16/195,158, filed on Nov. 19, 2018, now Pat. No. 10,782,948.

(51) Int. Cl.
*G06F 9/44* (2018.01)
*G06F 8/52* (2018.01)
*G06F 8/70* (2018.01)
*G06F 9/455* (2018.01)
*G06F 8/40* (2018.01)

(52) U.S. Cl.
CPC .............. *G06F 8/52* (2013.01); *G06F 8/40* (2013.01); *G06F 8/70* (2013.01); *G06F 9/4552* (2013.01)

(58) Field of Classification Search
None
See application file for complete search history.

(56) References Cited

U.S. PATENT DOCUMENTS

| 6,110,226 A | * | 8/2000 | Bothner | G06F 9/45516 717/153 |
| 7,213,240 B2 | | 5/2007 | Wong et al. | |
| 8,473,935 B2 | * | 6/2013 | Grice | G06F 8/48 717/151 |
| 8,707,282 B2 | | 4/2014 | Joshi et al. | |
| 8,819,650 B2 | | 8/2014 | Barcia et al. | |
| 2002/0138667 A1 | * | 9/2002 | Sokolov | G06F 9/445 719/331 |
| 2003/0070161 A1 | * | 4/2003 | Wong | G06F 8/47 717/148 |

(Continued)

*Primary Examiner* — Wei Y Zhen
*Assistant Examiner* — Lanny N Ung
(74) *Attorney, Agent, or Firm* — K&L Gates LLP (57) ABSTRACT

A system includes a memory and a processor in communication with the memory. The processor is configured to, prior to runtime, process application metadata for an application. The application metadata is classified into a first class used only for deployment, a second class used only for runtime, and a third class used for both runtime and deployment. Responsive to processing the application metadata, the processor is configured to build a deployment model from the processed application metadata. Prior to runtime, the processor is configured to generate an intermediate representation of the application from the deployment model. The intermediate representation of the application includes direct calls for classes associated with the second class of metadata and the third class of metadata.

20 Claims, 6 Drawing Sheets

(56) References Cited

U.S. PATENT DOCUMENTS

2005/0216885 A1* 9/2005 Ireland .................. G06F 9/4488
  717/108
2007/0033212 A1* 2/2007 Fifield .................... G06Q 10/00
2007/0169039 A1 7/2007 Lin
2007/0294679 A1* 12/2007 Bobrovsky ......... G06F 9/45516
  717/146
2010/0153929 A1 6/2010 Porras et al.
2012/0158807 A1* 6/2012 Woody ................ G06F 16/2365
  708/204

* cited by examiner

REDUCING APPLICATION STARTUP TIME BY GENERATING BYTECODE FROM METADATA AT BUILD TIME

CROSS REFERENCES TO RELATED APPLICATIONS

This application is a continuation of and claims priority to and the benefit of U.S. patent application Ser. No. 16/195,158, filed on Nov. 19, 2018, the entire content of which is hereby incorporated by reference.

BACKGROUND

Computer systems may run applications or services that are provided via a server or cloud. The applications or services can be developed and deployed at runtime. Application instances or services may run within containers, which may be run on physical or virtual machines. For example, containers may encapsulate a runtime environment for an application instance or service. Application instances may be started or replicated across nodes and each application instance may require classes, artifacts, dependencies, annotations, libraries, etc. to be loaded at various times (e.g., configuration, runtime or deployment).

SUMMARY

The present disclosure provides new and innovative systems and methods for reducing application startup time by generating bytecode from metadata at build time. In an example, a system includes a memory and a processor in communication with the memory. The processor is configured to, prior to runtime, process application metadata for an application. The application metadata is classified into a first class used only for deployment, a second class used only for runtime, and a third class used for both runtime and deployment. Responsive to processing the application metadata, the processor is configured to build a deployment model from the processed application metadata. Prior to runtime, the processor is configured to generate an intermediate representation of the application from the deployment model. The intermediate representation of the application includes direct calls for classes associated with the second class of metadata and the third class of metadata.

In an example, a method includes, prior to runtime, processing application metadata for an application. The application metadata is classified into a first class used only for deployment, a second class used only for runtime, and a third class used for both runtime and deployment. The method also includes, responsive to processing the application metadata, building a deployment model from the processed application metadata. Additionally, the method includes, prior to runtime, generating an intermediate representation from the deployment model for the application. The intermediate representation of the application includes direct calls for classes associated with the second class of metadata and the third class of metadata.

In an example, a method includes, prior to runtime, processing application metadata for each of a plurality of application instances of an application. The application metadata is classified into a first class used only for deployment, a second class used only for runtime, and a third class used for both runtime and deployment. The method also includes, responsive to processing the application metadata, building a deployment model from the processed application metadata and prior to runtime, generating, at a first time, an intermediate representation of the application from the deployment model. Additionally, the method includes executing, at a second time, the intermediate representation to start runtime services of a first instance of the application. Executing the intermediate representation includes directly calling classes associated with the second class of metadata and the third class of metadata.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for generating an intermediate representation (e.g., bytecode) from metadata at build time to reduce application startup time and runtime memory usage. Preprocessing metadata and generating bytecode prior to runtime (e.g., at build time) improves efficiency by allowing runtime services to start sooner and with a smaller runtime memory footprint. Specifically, by processing metadata once, rather than on every startup, less resources are used when starting nodes and application instances in a cloud environment.

Typically, application metadata is processed at runtime to start application services. In one example, frameworks that create jars, such as "uber-jars", which may also be referred to as "over-jars" or "fat-jars", are used to create single application packages. An uber-jar is a jar that contains a package and all the package dependencies in a single Java Archive ("JAR") file. An advantage of an uber-jar is that the uber-jar can be distributed to and loaded at a destination regardless of whether that destination has the appropriate dependencies installed at the destination. Since the package dependencies are part of the JAR file for an uber-jar, the uber-jar has no other external dependencies, and thus can be implemented at a destination regardless of whether that destination has the package dependencies preloaded.

With the frameworks that create uber-jars, the details of an application are typically known at build time. However, even though the metadata required to process the deployment is present at build time, the metadata is still typically processed at runtime, which results in a slower startup and additional memory usage. For example, when the metadata is processed at runtime, eXtensible Markup Language ("XML") and annotations are parsed and then processed at runtime to form a complete deployment model. Parsing and processing the XML and annotations may involve loading several different classes, which increase the memory footprint of the application. The disadvantages associated with the slower startup times and additional memory usage are augmented when implementing application instances on a cloud. For example, hundreds to thousands of application instances may be deployed and started on the cloud, and each instance may incur these additional memory costs.

As described in the various example embodiments disclosed herein, to eliminate the need to process metadata at runtime, the system and methods disclosed herein advantageously process metadata at build time and transform the metadata into bytecode (e.g., Java Virtual Machine ("JVM") bytecode), which can be directly executed. For example, the system may process metadata, build a deployment model, and generate bytecode that bootstraps the services. Then, when the application is started, the bytecode is run directly, allowing runtime services to be started efficiently, thereby reducing startup times and reducing the memory footprint of the application.

Specifically, the metadata is only processed once, rather than on every application startup. By processing metadata up front at build time, fewer resources are used when starting nodes in a cloud environment. The present disclosure is especially advantageous to cloud providers that want to optimize the efficiency of the cloud by reducing startup times and reducing memory usage. For example, cloud providers like the Red Hat® Cloud Suite may utilize bytecode for application instances to reduce overhead. Additionally, the application only loads classes that are required for runtime, and not for deployment, which reduces the memory footprint of the application. Conversely, in traditional application server approaches, a large number of classes are loaded at runtime even though these classes are typically only used at deployment time to process deployment metadata. These classes loaded for deployment often remain present after the application is started and result in a constant drag on the memory of the system. However, the systems and methods disclosed herein load less classes at runtime, which translates into less runtime memory usage because the resulting deployed application is smaller (i.e., it contains less classes).

The deployed application may be further optimized through dead code elimination. For example, unused or unusable code (e.g., dead code) may be eliminated and only services that are actually required by the current configuration will be invoked. In an example, tools such as GraalVM™ and/or Substrate VM may be used to perform ahead of time compilation to build a native image that provides dead code elimination. By using tools such as GraalVM™, Substrate VM and other dead code elimination techniques, additional code may be considered unused and eliminated, as only services that are actually required by the current application configuration are then invoked. By eliminating unused or unusable code, a smaller image is generated that uses less memory at runtime. Specifically, if a framework has ten features, but a specific application instance will only use three of the features, dead code elimination tools may build a native executable file from the bytecode that includes only the three used features instead of each of the ten features of the framework.

In an example, bytecode serialization may increase the likelihood of identifying and eliminating dead code by tools such as GraalVM™ and/or Substrate VM. For example, a traditional application server may include a code (e.g., "addServlet") that checks for the presence of a WebServlet annotation, which may be used to declare a servlet. If the WebServlet annotation is present, then the associated servlets are registered. However, even if there are zero servlets, the traditional approach does not allow for any dead code elimination because the dead code elimination tool (e.g., Substrate VM) would not know whether servlets will be present. For example, the WebServlet annotation may not be present. Therefore, the dead code elimination tool retains all the code related to the servlets (e.g., "addServlet"). Conversely, using the approached detailed in the various embodiments described herein, any applicable register servlets are included in the generated bytecode. If there are no servlets, then no associated bytecode is generated and Substrate VM may easily determine that the "addServlet" is never called and may eliminate it. For some features, eliminating dead code may results in removal of large blocks of code that is unnecessary or unused by the application. By reducing the runtime overhead of applications (e.g., Java applications), the present disclosure may provide significant advantages in cloud environments.

Figure 1:
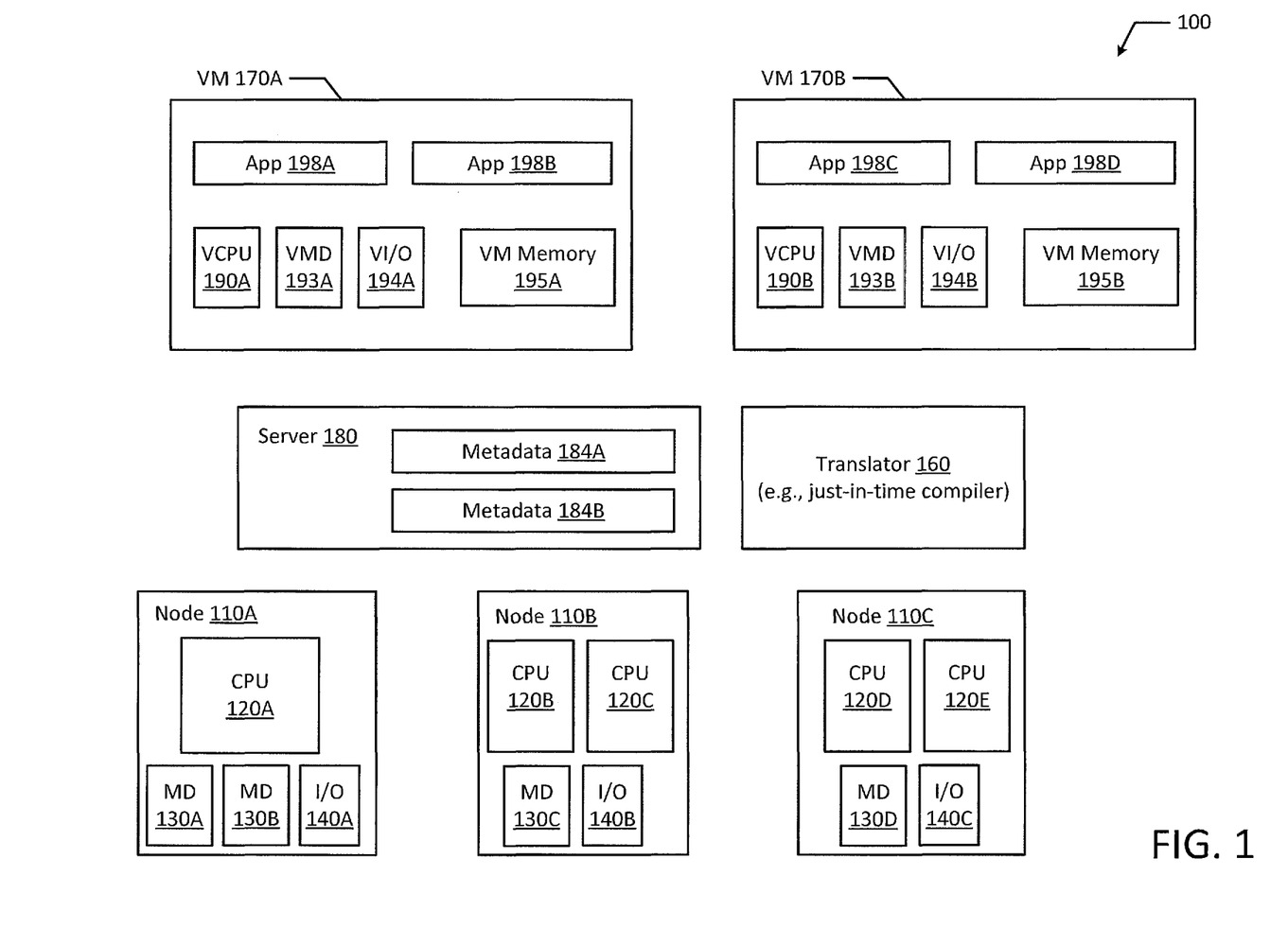
FIG. 1 illustrates a block diagram of an example computing system according to an example embodiment of the present disclosure.

FIG. 1 depicts a high-level component diagram of an example computing system 100 in accordance with one or more aspects of the present disclosure. The computing system 100 may include a server 180, translator 160, one or more virtual machines (VM 170A-B), and nodes (e.g., nodes 110A-C).

Server 180 may store metadata (e.g., metadata 184A-B) for various applications (e.g., Applications 198A-D). In an example, Applications 198A-D may be different applications or services. In another example, applications 198A-D may be different instances of the same application or service. The metadata (e.g., metadata 184A-B) for the various applications may include applications artifacts, dependencies, XML, annotations, libraries, etc. Dependencies may include tools, package management software (e.g., Red Hat Package Manager or other package management tools), etc. Dependencies may also include runtime dependencies that are required for execution, compile dependencies used during application compilation, system dependencies, etc.

Virtual machines 170A-B may include a virtual machine memory (VM Memory), a virtual CPU (VCPU), virtual memory devices (VMD), and virtual input/output devices (VI/O). For example, virtual machine 170A may include virtual machine memory 195A, a virtual CPU 190A, a virtual memory devices 192A, and a virtual input/output device 194A. Similarly, virtual machine 170B may include virtual machine memory 195B, a virtual CPU 190B, a virtual memory devices 192B, and a virtual input/output device 194B.

Translator 160 may be a dynamic translator. In an example, translator 160 may be a compiler, such as a just-in-time ("JIT") compiler. The translator may process metadata (e.g., metadata 184A-B, referred to generally as metadata 184) and build a deployment model for the application. The translator 160 may also generate an intermediate representation from the deployment model, such as bytecode (e.g., JVM bytecode). The bytecode may bootstrap runtime services by directly calling runtime classes when the bytecode is executed. In an example, the translator 160 may translate bytecode into machine code for the virtual machines 170A-B at runtime. The translator 160 may be a program running on a processor (e.g., CPU 120A-E or VCPU 190A-B). For example, VCPU 190A and VCPU 190B may each have their own translator that runs on the processor.

In an example, a virtual machine 170A may execute a guest operating system and run applications 198A-B which may utilize the underlying VCPU 190A, VMD 192A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186.

In an example, virtual machines 170A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
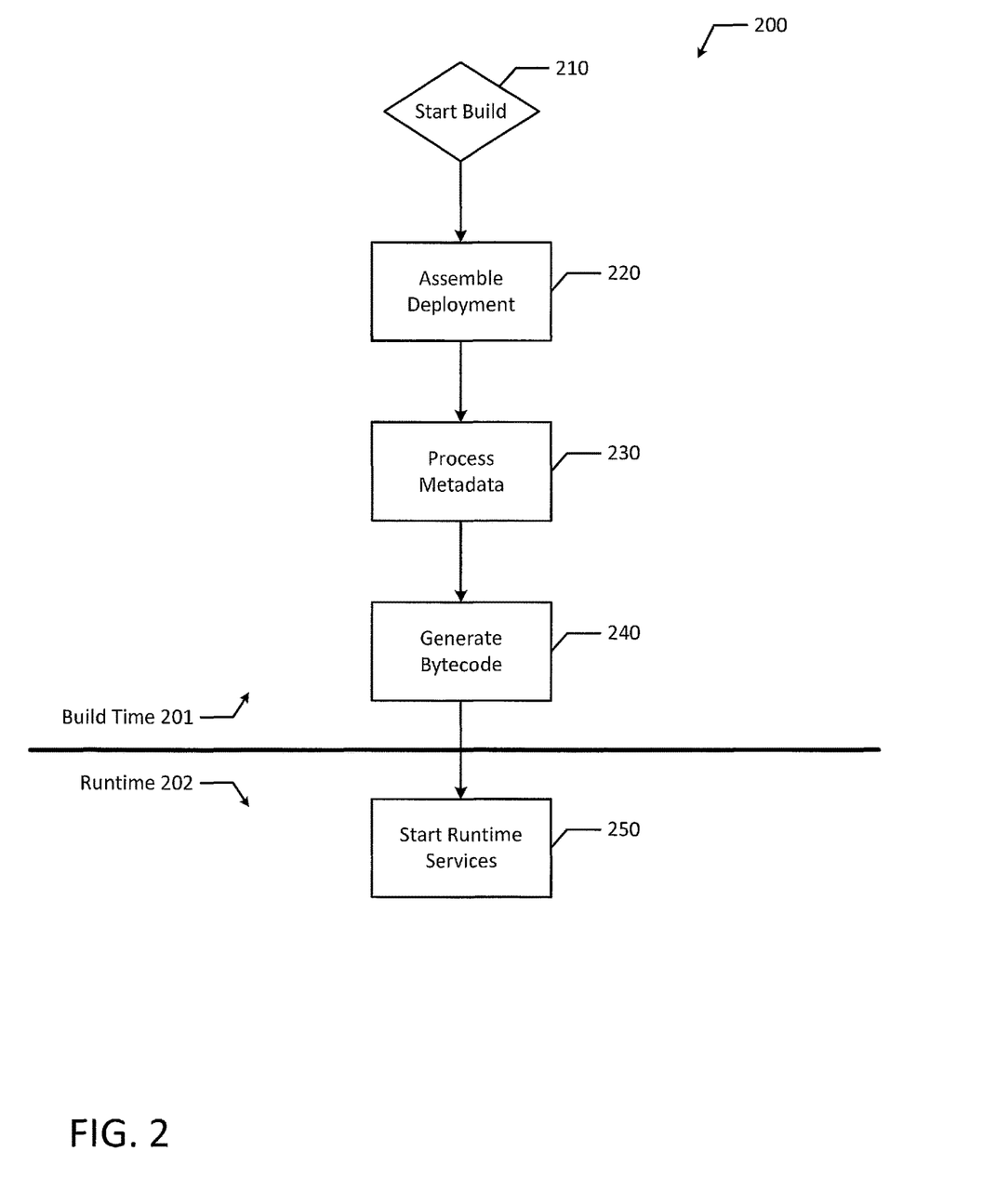
FIG. 2 illustrates a flowchart of an example process for reducing application startup time by generating bytecode from metadata at build time according to an example embodiment of the present disclosure.

FIG. 2 illustrates a flowchart of an example method 200 for reducing application startup time by generating bytecode from metadata at build time. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes starting an application build (block 210) prior to runtime 202 (e.g., at build time 201). Then, method 200 includes assembling a deployment of an application (block 220) and processing metadata (block 230). In an example, a deployment model may be built based on the cloud. For example, a deployment model may be based on the cloud environment (e.g., public cloud, community cloud, private cloud, hyper cloud). The metadata 184 is processed to generate bytecode (block 240) prior to runtime. Then, at runtime, method 200 includes starting runtime services (block 250). For example, the bytecode may be executed to start runtime services and the executed bytecode may bootstrap the runtime services. When the application is started, the bytecode is run directly, advantageously allowing runtime services to be started efficiently without having to processor parse metadata 184 at runtime. By pre-processing the metadata 184, the metadata 184 is processed a single time rather than on every startup, which conserves system resources (e.g., runtime memory) and reduces startup times. The memory savings become more substantial when starting nodes or application instances in cloud environments. For example, using an additional MB at build time may not appear significant for a single application, but in cloud environments with thousands of nodes running application instances (where each would use an additional MB of runtime memory), the runtime memory savings is more pronounced.

For example, overhead reduction may be achieved for frameworks that would typically load parsers (e.g., XML parsers) having multiple configuration classes (e.g., thousands of classes) loaded at runtime even though those classes are not required for runtime services. These configuration classes may then continue to hang around in the runtime environment resulting in a constant drain of runtime memory. Furthermore, additional overhead may be reduced by using a dead code elimination tool. For example, for frameworks that typically only use 50 percent of the functionality of the full framework, the overhead associated with the 50 percent of unused framework features may also be freed up.

Figure 3:
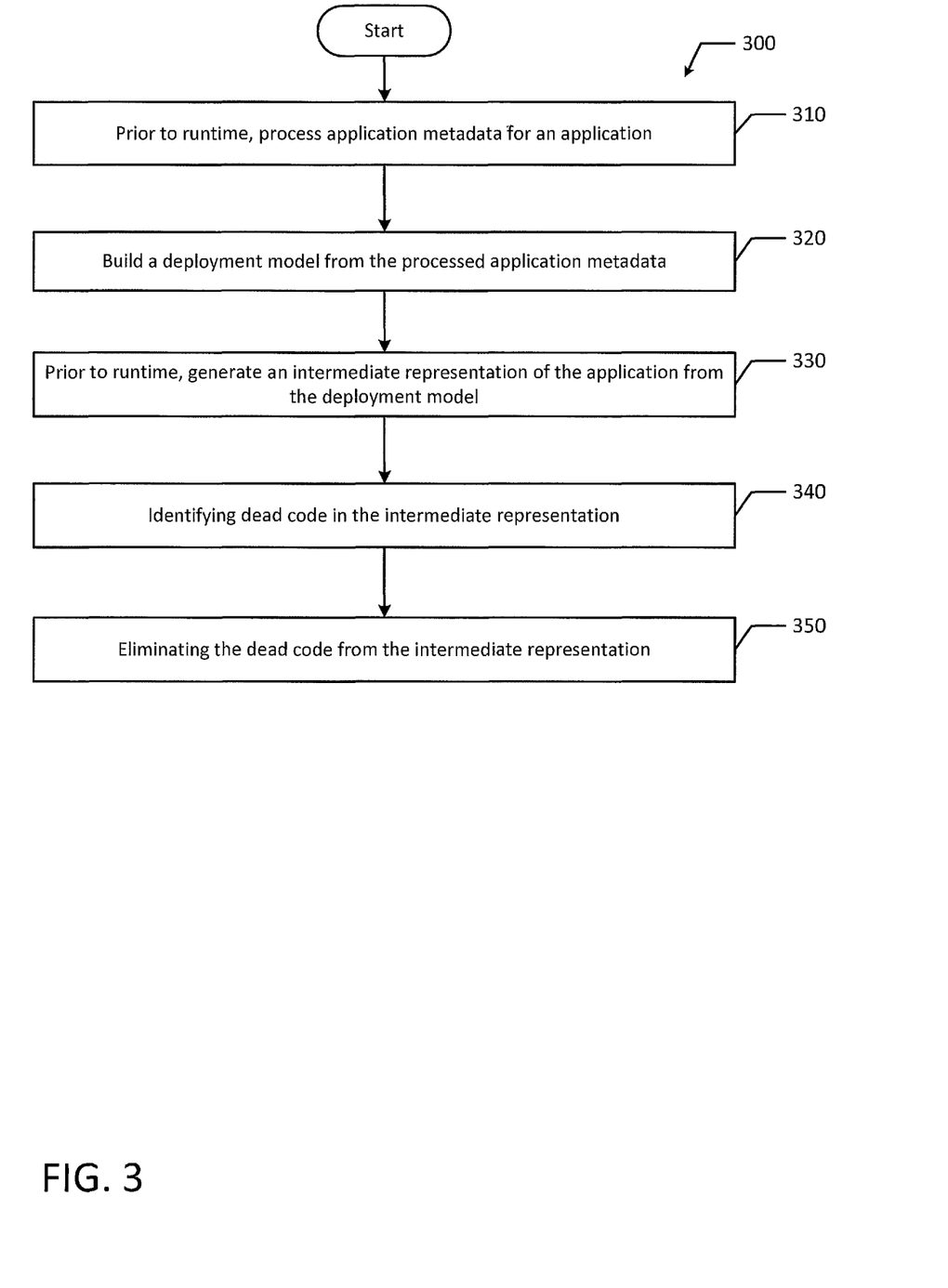
FIG. 3 illustrates a flowchart of an example process for reducing application startup time by generating bytecode from metadata at build time according to an example embodiment of the present disclosure.

FIG. 3 illustrates a flowchart of an example method 300 for reducing application startup time by generating bytecode from metadata at build time. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes prior to runtime, processing application metadata for an application (block 310). For example, application metadata 184 may be processed at build time. The application metadata 184 may be classified into a first class used only for deployment, a second class used only for runtime and a third class used for both runtime and deployment. For example, some metadata may be associated with classes, artifacts, dependencies, annotations, libraries, etc. that is only used for runtime services while other portions of the metadata may be associated with configuration or deployment. In an example, a translator 160 or compiler may process the metadata prior to runtime (e.g., at build time). Then, method 300 includes building a deployment model from the processed application metadata (block 320). For example, responsive to processing the application metadata 184, a deployment model may be built from the processed application metadata 184. In an example, a compiler or translator 160 may build the deployment model. Additionally, method 300 includes generating, prior to runtime, an intermediate representation of the application from the deployment model (block 330). For example, the metadata 184 may be processed to generate an intermediate representation such as bytecode, which includes direct calls for classes associated with the second class of metadata and the third class of metadata.

Method 300 also includes identifying dead code in the intermediate representation (block 340). For example, the compiler or translator 160 may identify unused or unusable code (e.g., dead code) from the intermediate representation. The intermediate representation may be bytecode, such as JVM bytecode. In another example, a dead code elimination tool such as GraalVM™ and/or Substrate VM may identify the dead code. Additionally, method 300 includes eliminating the dead code from the intermediate representation (block 350). For example, the compiler or translator 160 may eliminate the dead code from the intermediate representation to generate an optimized bytecode resulting in a smaller image that uses less memory at runtime.

In an example, the bytecode (e.g., JVM bytecode) may also be referred to as portable code or p-code. The bytecode is a form of instruction set designed for efficient execution by a software interpreter, and the bytecode is a compact numeric code that encode the result of compiler parsing. It should be appreciated that other forms of bytecode or native executable files may be generated. For example, common language runtime ("CLR") bytecode, common intermediate language ("CIL") bytecode or other executable codes may be generated. By pre-generating the bytecode, application instances or runtime services may advantageously be started efficiently without processing and parsing metadata at runtime, which saves time and reduces the instant memory consumption of the application instance and reduces the memory footprint of the application during the applications life.

Figure 4:
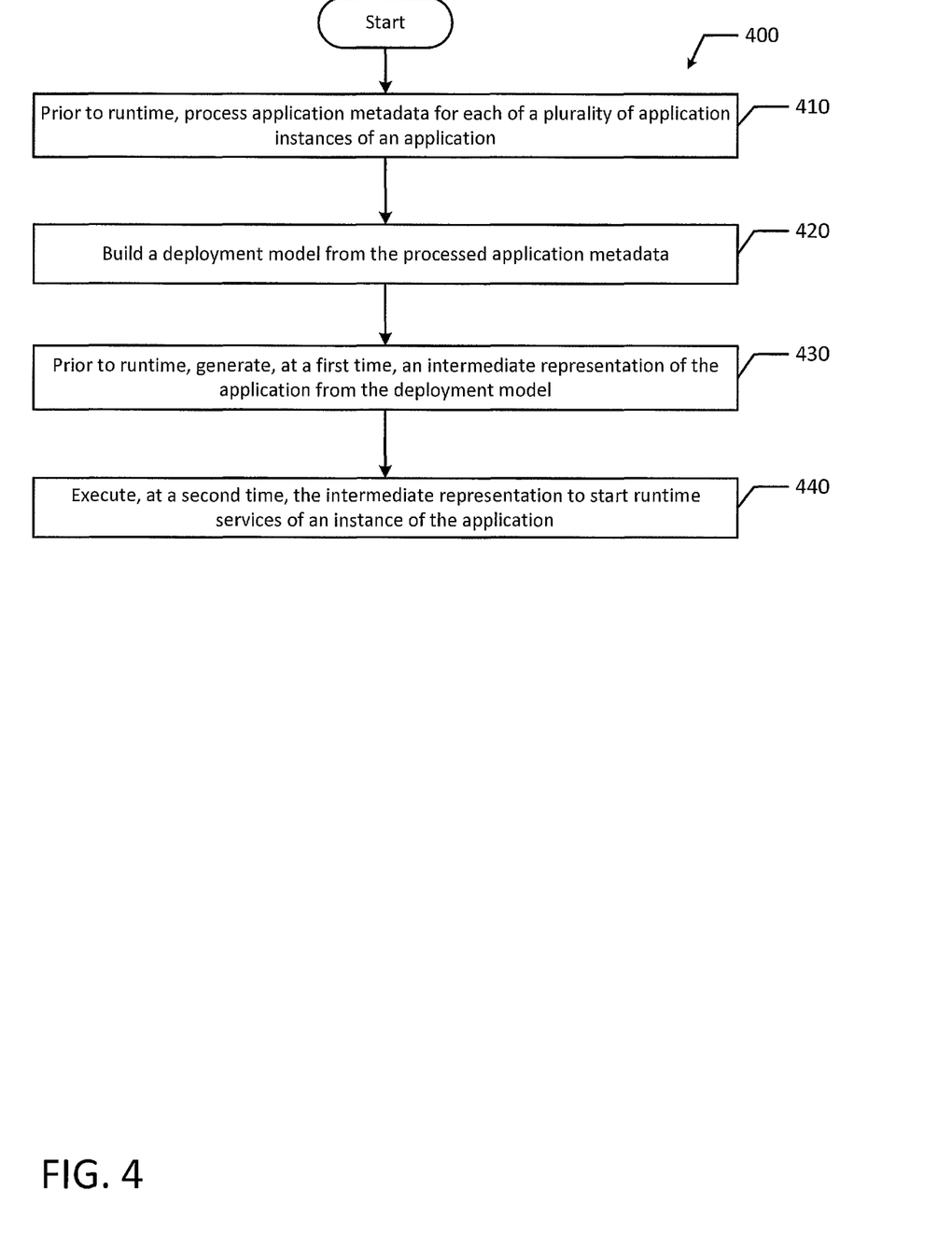
FIG. 4 illustrates a flowchart of an example process for generating and executing bytecode from metadata at build time to reduce application instance startup time according to an example embodiment of the present disclosure.

FIG. 4 illustrates a flowchart of an example method 400 for generating and executing bytecode from metadata at build time to reduce application instance startup time and runtime memory usage. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes prior to runtime, processing application metadata for each of a plurality of application instances of an application (block 410). For example, application metadata 184 may be processed at build time. The application metadata 184 may be classified into a first class used only for deployment, a second class used only for runtime and a third class used for both runtime and deployment. Then, method 400 includes building a deployment model from the processed application metadata (block 420). For example, responsive to processing the application metadata 184, a deployment model may be built from the processed application metadata 184. In an example, a compiler or translator may build the deployment model. Additionally, method 400 includes generating, prior to runtime at a first time, an intermediate representation of the application from the deployment model (block 430). For example, the metadata 184 may be processed to generate an intermediate representation such as bytecode, which may also be referred to as portable code or p-code. In the illustrated example, the first time may be after processing the application metadata and building a deployment model (e.g., at build time). Additionally, the intermediate representation (e.g., bytecode) may be further optimized by eliminating dead code.

Then, method 400 includes executing, at a second time, the intermediate representation to start runtime services of an instance of the application (block 440). For example, executing the bytecode may include directly calling classes associated with the second class of metadata and the third class of metadata. The second time may be after the first time (e.g., after build time or at runtime). The bytecode advantageously allows runtime services to start by only calling classes used for runtime. Conversely, other classes (e.g., classes used for deployment), are often called using traditional techniques, which may hang around during the lifetime of the application and continue to use and waste runtime memory. For example, an XML parser may include thousands of classes that are only used for configuration but not used in the application at runtime. Each of these classes may hang around and cause a constant drag on the system (e.g., may constantly consume runtime memory and slow the application down). However, by generating and executing the bytecode, loading unnecessary classes is advantageously avoided thereby allowing for faster application startup times with reduced memory footprints.

Figure 5:
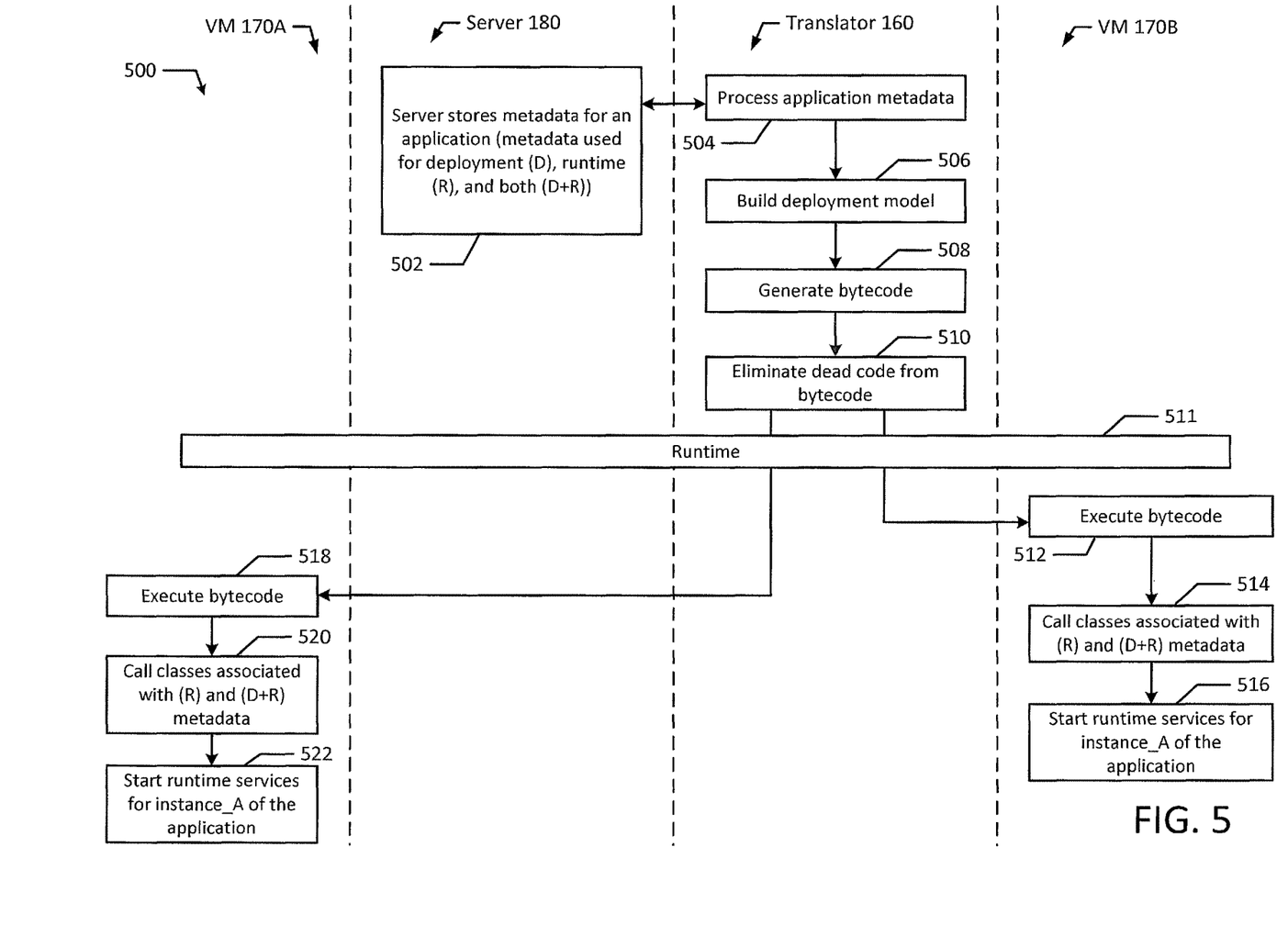
FIG. 5 illustrates a flow diagram of an example process for generating bytecode from metadata prior to runtime to reduce application startup time according to an example embodiment of the present disclosure.

FIG. 5 illustrates a flowchart of an example method 500 for generating bytecode from metadata prior to runtime (e.g., at build time) to reduce application startup time in accordance with an example embodiment of the present disclosure. Although the example method 500 is described with reference to the flowchart illustrated in FIG. 5 it will be appreciated that many other methods of performing the acts associated with the method 500 may be used. For example, the order of some of the blocks may be changed, certain blocks may be combined with other blocks, blocks may be repeated, and some of the blocks described are optional. For example, a server 180 and translator 160 may communicate with virtual machines 170A-B to perform example method 500.

In the illustrated example, server 180 stores metadata for an application (block 502). For example, the server may store details of an application, such as application metadata 184. The metadata 184 may be used to process the deployment of various application instances of the application. For example, the metadata 184 may include metadata used for deployment, metadata used for runtime, and metadata used for both deployment and runtime. In an example, the application metadata 184 may be included in a JAR file. Then, translator 160 processes the application metadata (block 504). For example, prior to runtime, the translator 160 may process the metadata. In an example, the metadata 184 may include XML, classes, annotations, etc. The translator 160 may parse and process the metadata.

After parsing and processing the metadata, the translator 160 may build a deployment model (block 506). For example, the translator 160 may arrange, organize and combine the processed metadata 184 with the appropriate bindings and deployment descriptors for application deployment. In an example, a deployment model may be built based on the cloud. For example, the translator 160 may build a deployment model based on the cloud environment (e.g., public cloud, community cloud, private cloud, hyper cloud). Then, the translator generates bytecode (block 508). For example, to avoid the overhead associated with processing metadata 184 at runtime, the translator 160 processes the metadata 184 prior to runtime and generates bytecode (e.g., JVM bytecode), which is adapted for direct execution. By preprocessing the metadata 184 and building a deployment model, the resulting information is used to generate bytecode. The bytecode is configured to automatically bootstraps startup services when executed. The translator 160 may also eliminate dead code from the bytecode (block 510). For example, portions of the bytecode that are unused or unusable (e.g., dead code) may be eliminated by translator 160 or by a dead code elimination tool (e.g., GraalVM or Substrate VM). In an example, the refined bytecode may be converted into native executable files.

Once the bytecode is generated, the bytecode may be used to start runtime services for several application instances on the cloud. In the illustrated example, the bytecode is pre-generated prior to runtime (block 511). For example, the bytecode may be generated well before any application instances are started on the cloud. Then, virtual machine 170B may execute the bytecode (block 512). For example, to start an application instance, the virtual machine 170B may execute JVM bytecode directly. Upon executing the bytecode, the bytecode directly calls classes associated with metadata used for runtime (block 514). The bytecode advantageously allows for direct calls to classes used for runtime without loading classes used only for deployment, thereby reducing the amount of classes called and loaded during runtime. By calling and loading less classes, runtime memory usage and startup time is advantageously reduced. After loading the appropriate classes for runtime, the runtime services for instance_A of the application are started (block 516). Then, instance_A may perform tasks and continue to run while maintaining an optimized memory footprint (e.g., a footprint that uses less runtime memory).

Other instances of the application may also be started. In the illustrated example, virtual machine 170A executes the same bytecode (block 518). For example, to start another instance of the application, the virtual machine 170A may execute the previously generated JVM bytecode directly. Upon executing the bytecode, the bytecode directly calls classes associated with metadata used for runtime (block 520). The bytecode advantageously allows for direct calls to classes used for runtime without loading classes for deployment, thereby reducing the amount of classes called and loaded during runtime. By calling and loading less classes, runtime memory usage is advantageously reduced for the application instance. After loading the appropriate classes for runtime, the runtime services for instance_B of the application are started (block 522). Similar to instance_A, application instance_B may also operate with an optimized memory footprint. Each application instance started by executing the bytecode may provide additional overhead savings to the cloud compared to traditional approaches where each application instance typically involves processing and parsing metadata at runtime.

By processing metadata 184 and generating bytecode prior to runtime, the processing for the application is performed once, rather than on every startup for traditional approaches, which advantageously results using fewer resources when starting nodes in a cloud environment. Each application instance only loads classes that are used for runtime instead of loading deployment classes. In a traditional application server, a large number of classes are loaded that are typically only sued at deployment to process deployment metadata, which uses additional runtime memory. In the illustrated method discussed above, the bytecode is executed and loads less classes thereby allowing applications to start up more efficiently (e.g., applications start up with less time and use less runtime memory). Furthermore, the resulting deployed application instance may be smaller than an application instance started using the traditional approach. By reducing runtime overhead of applications (e.g., Java applications), memory footprint and memory consumption is advantageously reduced which provides performance and cost advantages, specifically in cloud environments.

Figure 6:
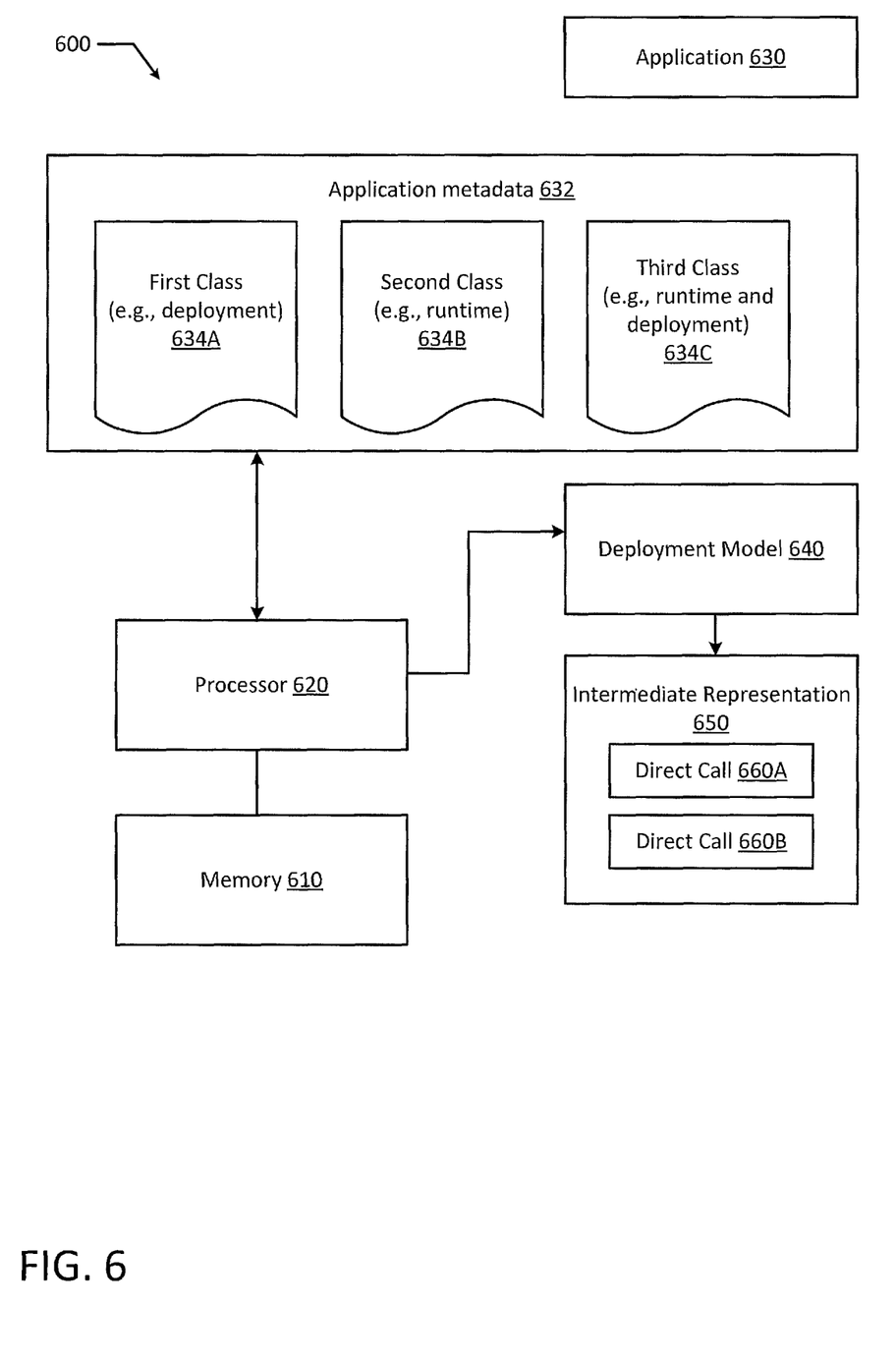
FIG. 6 illustrates a block diagram of an example bytecode generation system according to an example embodiment of the present disclosure.

FIG. 6 is a block diagram of an example bytecode generation system 600 according to an example embodiment of the present disclosure. The bytecode generation system 600 includes a memory 610 and a processor 620 in communication with the memory 610. The processor 620 may be configured to, prior to runtime, process application metadata 632 for an application 630. The application metadata 632 is classified into a first class 634A used only for deployment, a second class 634B used only for runtime, and a third class 634C used for both runtime and deployment. Responsive to processing the application metadata 632, the processor 620 may be configured to build a deployment model 640 from the processed application metadata 632. Prior to runtime, the processor 620 may also be configured to generate an intermediate representation 650 of the application 630 from the deployment model 640. The intermediate representation 650 of the application 630 may include direct calls 660A-B for classes associated with the second class 634B of metadata and the third class 634C of metadata.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory and a processor in communication with the memory. The processor is configured to, prior to runtime, process application metadata for an application. The application metadata is classified into a first class used only for deployment, a second class used only for runtime, and a third class used for both runtime and deployment. Responsive to processing the application metadata, the processor is configured to build a deployment model from the processed application metadata. Prior to runtime, the processor is configured to generate an intermediate representation of the application from the deployment model. The intermediate representation of the application includes direct calls for classes associated with the second class of metadata and the third class of metadata.

In a 2nd exemplary aspect of the present disclosure, which may be used in combination with any one or more of the preceding aspects (e.g., the 1st aspect), the application metadata is processed prior to runtime at build time.

In a 3rd exemplary aspect of the present disclosure, which may be used in combination with any one or more of the preceding aspects (e.g., the 1st aspect), the intermediate representation is bytecode.

In a 4th exemplary aspect of the present disclosure, which may be used in combination with any one or more of the preceding aspects (e.g., the 3rd aspect), the bytecode is Java Virtual Machine bytecode.

In a 5th exemplary aspect of the present disclosure, which may be used in combination with any one or more of the preceding aspects (e.g., the 1st aspect), the processor is a virtual processor.

In a 6th exemplary aspect of the present disclosure, which may be used in combination with any one or more of the preceding aspects (e.g., the 5th aspect), the virtual processor executes in a virtual machine.

In a 7th exemplary aspect of the present disclosure, which may be used in combination with any one or more of the preceding aspects (e.g., the 1st aspect), the processor is further configured to eliminate dead code from the intermediate representation.

In a 8th exemplary aspect of the present disclosure, which may be used in combination with any one or more of the preceding aspects (e.g., the 1st aspect), the system further includes a compiler. The compiler executes on the processor to process the application metadata, build the deployment model, and generate the intermediate representation.

Aspects of the subject matter described herein may be useful alone or in combination with one or more other aspects described herein. In a 9th exemplary aspect of the present disclosure, a system includes a memory and a processor in communication with the memory. The processor is configured to, prior to runtime, process application metadata for each of a plurality of application instances. The application metadata is classified into a first class used only for deployment, a second class used only for runtime, and a third class used for both runtime and deployment. Responsive to processing the application metadata, the processor is configured to build a deployment model from the processed application metadata. Prior to runtime, the processor is configured to generate, at a first time, an intermediate representation of the application from the deployment model. Additionally, the processor is configured to execute, at a second time, the intermediate representation to start runtime services of a first instance of the application. Executing the intermediate representation includes directly calling classes associated with the second class of metadata and the third class of metadata.

In a 10th exemplary aspect of the present disclosure, which may be used in combination with any one or more of the preceding aspects (e.g., the 9th aspect), the application metadata is processed prior to runtime at build time.

In an 11th exemplary aspect of the present disclosure, which may be used in combination with any one or more of the preceding aspects (e.g., the 9th aspect), the intermediate representation is bytecode.

In a 12th exemplary aspect of the present disclosure, which may be used in combination with any one or more of the preceding aspects (e.g., the 11th aspect), the bytecode is Java Virtual Machine bytecode.

In a 13th exemplary aspect of the present disclosure, which may be used in combination with any one or more of the preceding aspects (e.g., the 9th aspect), the processor is a virtual processor.

In a 14th exemplary aspect of the present disclosure, which may be used in combination with any one or more of the preceding aspects (e.g., the 13th aspect), the virtual processor executes in a virtual machine.

In a 15th exemplary aspect of the present disclosure, which may be used in combination with any one or more of the preceding aspects (e.g., the 9th aspect), system further includes a compiler, which executes on the processor to process the application metadata, build the deployment model, and generate the intermediate representation.

In a 16th exemplary aspect of the present disclosure, which may be used in combination with any one or more of the preceding aspects (e.g., the 9th aspect), the processor is further configured to execute, at a third time, the intermediate representation generated at the first time to start runtime services of a second instance of the application.

In a 17th exemplary aspect of the present disclosure, which may be used in combination with any one or more of the preceding aspects (e.g., the 16th aspect), the second time is after the first time.

In an 18th exemplary aspect of the present disclosure, which may be used in combination with any one or more of the preceding aspects (e.g., the 17th aspect), the third time is after the second time.

Aspects of the subject matter described herein may be useful alone or in combination with one or more other aspects described herein. In a 19th exemplary aspect of the present disclosure, a method includes, prior to runtime, processing application metadata for an application. The application metadata is classified into a first class used only for deployment, a second class used only for runtime, and a third class used for both runtime and deployment. The method also includes, responsive to processing the application metadata, building a deployment model from the processed application metadata. Additionally, the method includes, prior to runtime, generating an intermediate representation from the deployment model for the application. The intermediate representation of the application includes direct calls for classes associated with the second class of metadata and the third class of metadata. The method further includes identifying dead code in the intermediate representation and eliminating the dead code from the intermediate representation.

In a 20th exemplary aspect of the present disclosure, which may be used in combination with any one or more of the preceding aspects (e.g., the 19th aspect), the application metadata is processed prior to runtime at build time.

In a 21st exemplary aspect of the present disclosure, which may be used in combination with any one or more of the preceding aspects (e.g., the 19th aspect), the intermediate representation is bytecode.

In a 22nd exemplary aspect of the present disclosure, which may be used in combination with any one or more of the preceding aspects (e.g., the 21st aspect), the bytecode is Java Virtual Machine bytecode.

In a 23rd exemplary aspect of the present disclosure, which may be used in combination with any one or more of the preceding aspects (e.g., the 19th aspect), the method further includes building a native executable file from the intermediate representation after the dead code is eliminated.

Aspects of the subject matter described herein may be useful alone or in combination with one or more other aspects described herein. In a 24th exemplary aspect of the present disclosure, a method includes, prior to runtime, processing application metadata for each of a plurality of application instances of an application. The application metadata is classified into a first class used only for deployment, a second class used only for runtime, and a third class used for both runtime and deployment. The method also includes, responsive to processing the application metadata, building a deployment model from the processed application metadata and prior to runtime, generating, at a first time, an intermediate representation of the application from the deployment model. Additionally, the method includes executing, at a second time, the intermediate representation to start runtime services of a first instance of the application. Executing the intermediate representation includes directly calling classes associated with the second class of metadata and the third class of metadata.

In a 25th exemplary aspect of the present disclosure, which may be used in combination with any one or more of the preceding aspects (e.g., the 24th aspect), the application metadata is processed prior to runtime is at build time.

In a 26th exemplary aspect of the present disclosure, which may be used in combination with any one or more of the preceding aspects (e.g., the 24th aspect), the intermediate representation is bytecode.

In a 27th exemplary aspect of the present disclosure, which may be used in combination with any one or more of the preceding aspects (e.g., the 26th aspect), the bytecode is Java Virtual Machine bytecode.

In a 28th exemplary aspect of the present disclosure, which may be used in combination with any one or more of the preceding aspects (e.g., the 24th aspect), a translator executes the intermediate representation.

In a 29th exemplary aspect of the present disclosure, which may be used in combination with any one or more of the preceding aspects (e.g., the 28th aspect), the translator is a just-in-time compiler.

In a 30th exemplary aspect of the present disclosure, which may be used in combination with any one or more of the preceding aspects (e.g., the 24th aspect), method further includes executing, at a third time, the intermediate representation generated at the first time to start runtime services of a second instance of the application.

In a 31st exemplary aspect of the present disclosure, which may be used in combination with any one or more of the preceding aspects (e.g., the 30th aspect), the second time is after the first time.

In a 32nd exemplary aspect of the present disclosure, which may be used in combination with any one or more of the preceding aspects (e.g., the 31st aspect), the third time is after the second time.

Aspects of the subject matter described herein may be useful alone or in combination with one or more other aspects described herein. In a 33rd exemplary aspect of the present disclosure, a system includes a means to process application metadata, prior to runtime, for an application. The application metadata is classified into a first class used only for deployment, a second class used only for runtime, and a third class used for both runtime and deployment. The system also includes a means to build a deployment model from the processed application metadata responsive to processing the application metadata. Additionally, the system includes a means to generate, prior to runtime, an intermediate representation of the application from the deployment model. The intermediate representation of the application includes direct calls for classes associated with the second class of metadata and the third class of metadata.

Aspects of the subject matter described herein may be useful alone or in combination with one or more other aspects described herein. In a 34th exemplary aspect of the present disclosure, a system includes a means to process application metadata, prior to runtime, for any of a plurality of application instances of an application. The application metadata is classified into a first class used only for deployment, a second class used only for runtime, and a third class used for both runtime and deployment. The system also includes a means to build a deployment model from the processed application metadata responsive to processing the application metadata and a means to generate, at a first time prior to runtime, an intermediate representation of the application from the deployment model. Additionally, the system includes a means to execute, at a second time, the intermediate representation to start runtime services of a first instance of the application. The means to execute the intermediate representation includes a means to directly call classes associated with the second class of metadata and the third class of metadata.

In a 35th exemplary aspect of the present disclosure, which may be used in combination with any one or more of the preceding aspects (e.g., the 34th aspect), the system further includes an additional means to execute, at a third time, the intermediate representation generated at the first time to start runtime services of a second instance of the application.

Aspects of the subject matter described herein may be useful alone or in combination with one or more other aspects described herein. In a 36th exemplary aspect of the present disclosure, a non-transitory machine readable medium stores code, which when executed by a processor, is configured to, prior to runtime, process application metadata for an application. The application metadata is classified into a first class used only for deployment, a second class used only for runtime, and a third class used for both runtime and deployment. Responsive to processing the application metadata, the non-transitory machine readable medium is configured to build a deployment model from the processed application metadata. Additionally, prior to runtime, the non-transitory machine readable medium is configured to generate an intermediate representation of the application from the deployment model. The intermediate representation of the application includes direct calls associated with the second class of metadata and the third class of metadata.

Aspects of the subject matter described herein may be useful alone or in combination with one or more other aspects described herein. In a 37th exemplary aspect of the present disclosure, a non-transitory machine readable medium stores code, which when executed by a processor, is configured to, prior to runtime, process application metadata for any of a plurality of application instances of an application. The application metadata is classified into a first class used only for deployment, a second class used only for runtime, and a third class used for both runtime and deployment. Responsive to processing the application metadata, the non-transitory machine readable medium is configured to build a deployment model from the processed application metadata. Prior to runtime, the non-transitory machine readable medium is configured to generate, at a first time, an intermediate representation of the application from the deployment model. Additionally, the non-transitory machine readable medium is configured to execute, at a second time, the intermediate representation to start runtime services of a first instance of the application. Executing the intermediate representation includes directly calling classes associated with the second class of metadata and the third class of metadata.

In a 38th exemplary aspect of the present disclosure, which may be used in combination with any one or more of the preceding aspects (e.g., the 37th aspect), the non-transitory machine readable medium is further configured to execute, at a third time, the intermediate representation generated at the first time to start runtime services of a second instance of the application.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory; and
   a processor in communication with the memory, wherein the processor is configured to:
      process application metadata, wherein the application metadata is classified into a first class used for deployment, a second class used for runtime, and a third class used for both runtime and deployment,
      build a deployment model from the processed application metadata, and
      prior to runtime, generate an intermediate representation of an application from the deployment model, wherein the intermediate representation includes calls for classes associated with the second class of metadata and the third class of metadata.

2. The system of claim 1, wherein the application metadata is processed prior to runtime at build time.

3. The system of claim 1, wherein the intermediate representation is bytecode.

4. The system of claim 1, wherein the processor is a virtual processor, and wherein the virtual processor executes in a virtual machine.

5. The system of claim 1, wherein the processor is configured to eliminate dead code from the intermediate representation.

6. The system of claim 5, wherein the processor is configured to build a native executable file from the intermediate representation after the dead code is eliminated.

7. The system of claim 1, further comprising a compiler, wherein the compiler executes on the processor to process the application metadata, build the deployment model, and generate the intermediate representation.

8. The system of claim 1, further comprising a translator configured to execute the intermediate representation.

9. A method comprising:
   processing application metadata, wherein the application metadata is classified into a first class used for deployment, a second class used for runtime, and a third class used for both runtime and deployment;
   building a deployment model from the processed application metadata;
   prior to runtime, generating an intermediate representation from the deployment model for an application, wherein the intermediate representation includes calls for classes associated with the second class of metadata and the third class of metadata;
   identifying dead code in the intermediate representation; and
   eliminating the dead code from the intermediate representation.

10. The method of claim 9, wherein the application metadata is processed prior to runtime at build time.

11. The method of claim 9, wherein the intermediate representation is Java Virtual Machine bytecode.

12. The method of claim 9, further comprising:
   building a native executable file from the intermediate representation after the dead code is eliminated.

13. A method comprising:
   processing application metadata for each of a plurality of application instances of an application, wherein the application metadata is classified into a first class used for deployment, a second class used only runtime, and a third class used for both runtime and deployment;
   building a deployment model from the processed application metadata;
   prior to runtime, generating, at a first time, an intermediate representation of the application from the deployment model; and
   executing, at a second time, the intermediate representation to start runtime services of a first instance of the application, wherein executing the intermediate representation includes calling classes associated with the second class of metadata and the third class of metadata.

14. The method of claim 13, wherein the application metadata is processed prior to runtime at build time.

15. The method of claim 13, wherein the intermediate representation is bytecode.

16. The method of claim 13, wherein a translator executes the intermediate representation.

17. The method of claim 16, wherein the translator is a just-in-time compiler.

18. The method of claim 13, further comprising:
   executing, at a third time, the intermediate representation generated at the first time to start runtime services of a second instance of the application.

19. The method of claim 18, wherein the second time is after the first time.

20. The method of claim 19, wherein the third time is after the second time.

* * * * *